US005401587A

United States Patent [19]

Motohiro et al.

[11] Patent Number: 5,401,587

[45] Date of Patent: Mar. 28, 1995

[54] ANISOTROPIC NANOPHASE COMPOSITE MATERIAL AND METHOD OF PRODUCING SAME

[75] Inventors: Tomoyoshi Motohiro; Yasuhiko Takeda; Shoji Noda; Yoshihide Watanabe, all of Aichi, Japan

[73] Assignee: Kabushiki Kaisha Toyota Chuo Kenkyusho, Aichi, Japan

[21] Appl. No.: 675,878

[22] Filed: Mar. 27, 1991

[30] Foreign Application Priority Data

Mar. 27, 1990 [JP] Japan .................................. 2-80259

[51] Int. Cl.[6] .................................................. B32B 9/00

[52] U.S. Cl. .................................... 428/688; 359/352; 359/492; 427/124; 427/126.3; 427/162; 427/163.1; 428/689; 428/699; 428/701; 428/702

[58] Field of Search ............... 428/697, 699, 701, 702, 428/539.5, 548, 688, 615, 699, 620, 621, 457, 402, 411.1, 333, 323, 332; 372/21, 22, 27, 45, 98, 105; 385/128, 143; 427/124, 126.3, 162, 163; 359/352, 360, 486, 487, 488, 490, 491, 492

[56] References Cited

U.S. PATENT DOCUMENTS

| | | | |
|---|---|---|---|
| 4,275,102 | 6/1981 | Trojer et al. | 428/119 |
| 4,524,100 | 6/1985 | Shimizu et al. | 428/283 |
| 4,743,507 | 5/1988 | Franses et al. | 428/402 |
| 4,874,664 | 10/1989 | Hamaguchi et al. | 428/325 |
| 4,948,225 | 8/1990 | Rider et al. | 350/96.34 |
| 4,955,977 | 9/1990 | Dao et al. | 350/96.34 |
| 5,023,139 | 6/1991 | Birnboim et al. | 428/402 |
| 5,045,409 | 9/1991 | Eberspacher et al. | 428/620 |
| 5,073,449 | 12/1991 | Niimi et al. | 428/436 |

OTHER PUBLICATIONS

"Nanostructured Materials Promise to Advance Range of Technologies" Ron Dagani–C & EN Magazine ∝ vol. 70, No. 47 Nov. 23, 1992.

Japanese Journal of Applied Physics, vol. 20, No. 7, Jul. 1981, pp. 1249–1253, S. Keitoku, et al., "Grain Structure and Magnetic Anisotropy of Fe Film Evaporated Obliquely from Two Sources".

*Primary Examiner*—D. S. Nakarani
*Assistant Examiner*—H. Thi Le
*Attorney, Agent, or Firm*—Oblon, Spivak, McClelland, Maier & Neustadt

[57] ABSTRACT

An anisotropic nanophase composite material and a method of producing same. The composite material comprises a nanophase composite structure containing a multiplicity of particulates of at least one material. The particulates of one material are spaced from each other three-dimensionally and anisotropically oriented in a given direction. The particulates have an average thickness of 1 to 10 nanometers and an average length of not less than 10 nanometers, the length being larger than the thickness. Since the particulates of dimensions on the order of nanometers are oriented only in a given direction, the composite material produces an intensified nonlinear optical effect and is excellent in polarizing characteristics, birefringent characteristics, or photovoltaic characteristics.

14 Claims, 9 Drawing Sheets

F I G. 1
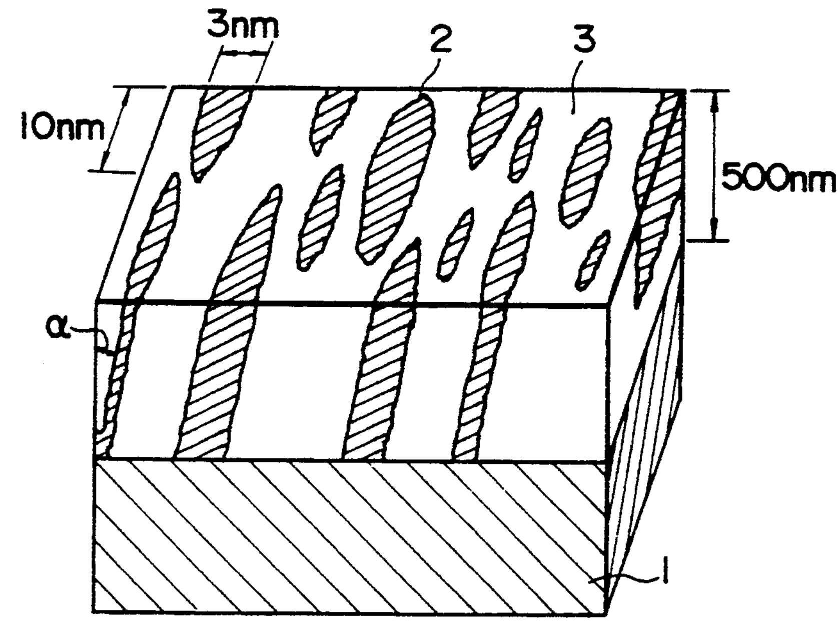
F I G. 2
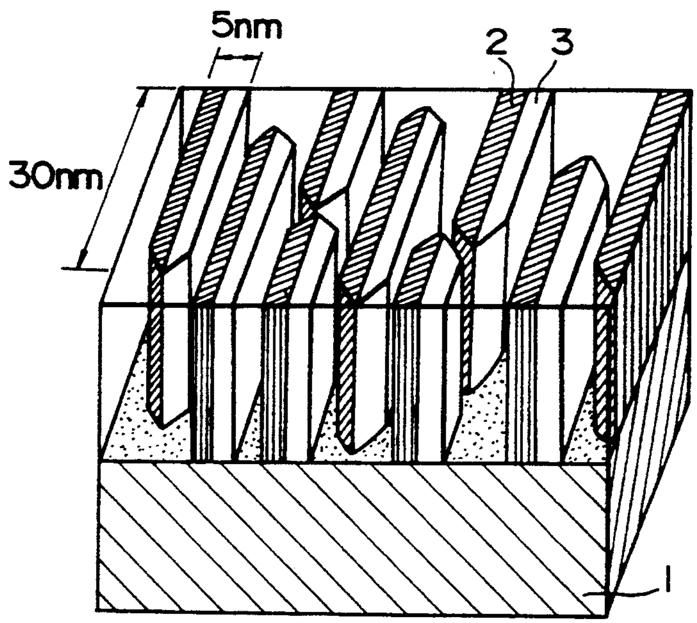

100 nm 20 nm

ANISOTROPIC NANOPHASE COMPOSITE MATERIAL AND METHOD OF PRODUCING SAME

BACKGROUND OF THE INVENTION

1. Field of the Invention

The present invention relates to an anisotropic nanophase composite material consisting of particulates of dimensions on the order of nanometers and showing several anisotropic physical properties such as an anisotropic nonlinear optical effect, birefringence, polarization, or a photovoltaic effect. The invention also relates to a method of producing such a composite material.

2. Description of the Related Art

Utilization of a nonlinear optical effect or polarization of composite materials in which structural units of dimensions on the order of nanometers such as metal particles or semiconductor crystallites are dispersed has been discussed.

We now describe nonlinear optical effects. When light of electric field E and oscillation frequency $\omega$ is incident on a substance, a wave of polarization of the frequency $\omega$ is induced in proportion to the electric field E in the substance. Then, light of the oscillation frequency $\omega$ originates from the wave of polarization. This is normal interaction of light with a substance, and the incident light is identical in oscillation frequency with the outgoing light. In some particular substances, however, light of electric field E and oscillation frequency $\omega$ induces considerably intense waves of polarization proportional to $E^n$. Substances of this nature are called nonlinear optical media. These substances show the following peculiar phenomena. They produce light having an oscillation frequency n times as high as the oscillation frequency of the incident light, i.e., the outgoing light shows a color different from that of the incident light. The refractive index of such a nonlinear optical medium may change as a function of the intensity of the light, or the square of the electric field. These are collectively known as nonlinear optical effects. Application of nonlinear optical effects to wavelength conversion of laser radiation and to optical logic devices has been discussed. Such a nonlinear optical effect is closely related to the quantum confinement effect described below.

Where the dimensions of metal or semiconductor particulates are of the order of nanometers, quantum particles which are involved in the interaction of light with a substance, such as electrons, holes and excitons, are hindered from moving freely. As a result, they produce peculiar phenomena not encountered in bulk state. This is called a quantum confinement effect. It is known that when this effect is produced, a strong nonlinear optical effect is developed. For this reason, the media in which the above-described particulates are dispersed and substances having structural features of dimensions on the order of nanometers are regarded as promising nonlinear optical materials and have been continuous subjects of investigation.

A method of producing a composite material in which particulates having dimensions of the order of nanometers and exhibiting a nonlinear optical effect are dispersed is described in New Glass, Vol. 3, No. 4, 41 (1989). In this method, glass and the material made up of particulates of dimensions on the order of nanometers are mixed up and melted. Then, the molten mixture is annealed again at an appropriate temperature so that the microscopic particulates may precipitate in the glass. Another method of producing a composite material in which particulates of dimensions on the order of nanometers are dispersed is described in Optical and Electro-Optical Engineering Contact (in Japanese), Vol. 27, No. 7, 389 (1989). In particular, glass and a material to be involved in glass matrix as particulates having dimensions of the order of nanometers are simultaneously evaporated onto a substrate, to form thin glass films with the aforementioned microscopic particulates dispersed therein. In this way, the composite material is produced with or without subsequent annealing.

Even in a medium in which structural units of dimensions on the order of nanometers such as crystallites are dispersed, a strong nonlinear optical effect is not effectively obtained from the whole medium unless the nonlinear optical effects produced by the individual particulates add together. In the composite materials produced by the above-described methods, the particulates of dimensions on the order of nanometers vary greatly in size. Also, their crystallographic axes are not aligned. Therefore, the latent potentials of nonlinear optical effect have not been fully realized yet, as reported by Survey of the Technologies on Measurement, Evaluation, and Control of Elementary Functions in Microscopic Regions of Materials (in Japanese), a report on research and investigation committed by the Japanese Science and Technology Agency in 1988, supervised by the General Research Department of the Research and Development Bureau of the Japanese Science and Technology Agency.

SUMMARY OF THE INVENTION

It is an object of the invention to provide a composite material in which a multiplicity of particulates consisting of at least one material and having dimensions of the order of nanometers are dispersed in such a way that the particulates are anisotropically oriented in a certain direction and spaced from each other.

It is another object of the invention to provide a method of producing the aforementioned composite material.

The anisotropic nanophase composite material according to the invention comprises a nanophase composite structure containing a multiplicity of particulates of at least one kind of material, the particulates of one material being spaced from each other, and dispersed in three dimensions. The term nanophase composite, as it appears throughout the specification, refers to a nanocomposite, which is well known as a composite of more than one Gibbsian solid phase where at least one dimension is in the nanometer range. The particulates are anisotropically oriented. The average thickness of the particulates is 1 to 10 nanometers and the average length is not less than 10 nanometers, the length being larger than the thickness. The length is preferably more than twice the thickness.

In the anisotropic composite material according to the invention, a multiplicity of particulates on the order of nanometers are spaced from each other, dispersed three-dimensionally and oriented anisotropically. The respective particulates have no spherical symmetry and they are oriented to a particular direction. Therefore, the nonlinear optical effects produced by the individual particulates add together. As a result, the composite material can be used as an optically bistable device or as a device producing phase conjugate waves at a high efficiency.

The anisotropic nanophase composite material according to the invention also shows excellent polarizing characteristics. In the related art grid polarizer consisting of parallel conductor wires, where the distance by which the wires are spaced from each other is shorter than the wavelength of the incident light, the grid polarizer acts as a polarizer. That component of the light which is polarized parallel to the wires is reflected, while that component of the light which is perpendicular to the wires is transmitted through the device. However, the interval between the successive wires can be reduced only to hundreds of nanometers even if ion beam etching process and holographic exposure process in which interference fringes created by interference of two laser beams are recorded on a photoresist are employed. The usable wavelength range is up to the near-infrared region. It is difficult to extend the usable wavelength range to a shorter wavelength range, i.e. up to the visible region. Since the structural units of the composite material of the invention have dimensions of the orders of nanometers, the material can be operated on the same principle as the grid polarizer described above. Namely, the material can be used as a polarizer at shorter wavelengths.

Where the composite material of the invention consists of two different semiconductors having a thickness of the order of nanometers, the two kinds of flat anisotropic particulates are alternately in intimate contact with each other to form a photovoltaic cell which operates in much the same way as innumerable tiny heterojunction solar cells are connected in series. Hence, a high-power solar battery which can produce a high voltage without lowering the output current can be fabricated. Also, the composite material of the present invention can develop birefringence.

A method of producing an anisotropic composite material comprises simultaneously depositing two materials onto the surface of a substrate from different directions inside a vacuum chamber. The temperature (in K) of the surface of the substrate is set less than one third of the temperature (in K) of the lower one of the melting points of the materials to be deposited. One of the two deposited materials is deposited from around the direction inclined at an angle of 30°–89° to the normal of the surface of the substrate, while the other is deposited from around the direction differing from the former direction by at least 30 degrees.

This method of the present invention makes it possible to produce an anisotropic composite material which could not been fabricated by the related art techniques. In this composite material, a multiplicity of particulates having substantially uniform dimensions of the order of nanometers are dispersed and oriented in the same direction. This method involves no complex steps. In this method, when the materials in a gas phase are deposited as films onto the substrate, the anisotropic composite material can be produced. In this way, the method of the present invention is easy to perform. Moreover, an anisotropic composite material having a large area can be produced.

These and other objects, features and advantages of this invention will become more apparent from the following description and the accompanying drawings.

BRIEF DESCRIPTION OF THE DRAWINGS

FIG. 1 is a pictorial representation of the anisotropic composite material of Example 1;

FIG. 2 is a pictorial representation of the anisotropic composite material of Example 2;

DETAILED DESCRIPTION OF THE INVENTION

An anisotropic composite material consisting of particulates of dimensions on the order of nanometers is made from at least one material selected from inorganic oxides, such as MgO, $Al_2O_3$, SiO, $SiO_2$, $TiO_2$, $V_2O_5$, CuO, ZnO, $GeO_2$, $ZnO_2$, $Nb_2O_5$, $MoO_3$, $In_2O_3$, $SnO_2$, $HfO_2$, $Ta_2O_5$, $WO_3$, $Bi_2O_3$, $La_2O_3$, and $CeO_2$, fluorides, such as $CaF_2$, $CeF_2$, and $MgF_2$, semiconductors, such as CdS, CdSe, CdTe, GaAs, Go, ZnTe, and znS, and metals, such as Fe, Co, Ni, Au, Ag, Al, Pt, and Ca. Usually, two of these materials are used in combination as follows.

(1) One material is an oxide or fluoride, while the other is a semiconductor or metal. A composite material of this combination shows a nonlinear optical effect or other property.

(2) One material is a semiconductor, while the other is a different semiconductor. A composite material of this combination can be used as a photovoltaic device.

(3) One material is an oxide or fluoride, whereas the other is a metal. A composite material of this combination can be employed as a polarizing plate or the like.

(4) Both materials are either different oxides or different fluorides. In a composite material of this composition, two kinds of particulates of dimensions on the order of nanometers are dispersed in large quantities in three dimensions. This composite material exhibits birefringence and can be used as a phase plate or the like.

It is necessary that these materials be anisotropic. The microscopic particulates are required to have an average thickness of 1 to 10 nanometers and an average length of not less than 10 nanometers, the length being larger than the thickness. It is also necessary that the particulates of the materials be anisotropically oriented; otherwise neither polarization nor nonlinear optical effect can be produced effectively. Typical examples of the structure are diagrammatically shown in FIGS. 1–3. Electron micrographs of the structure are shown in FIGS. 8–10 and 13.

FIG. 1 shows the structure of a composite material consisting of a multiplicity of particulates formed of one material 2 which are dispersed in large quantities in a material 3 different from the one material in three dimensions. The average thickness of the particulates is several nanometers, and the average length is tens of nanometers.

FIG. 2 shows the structure of another composite material consisting of a multiplicity of particulates of two kinds of materials. Each particulate takes the form of a flat sheet. The particulates are dispersed in large quantities in the structure which also contains numerous voids. The average thickness of the particulates is several nanometers, and the average length is tens of nanometers. The particulates of one material are stuck on the particulates of the other material such that these two kinds of particulates are opposite to each other.

Figure 3:
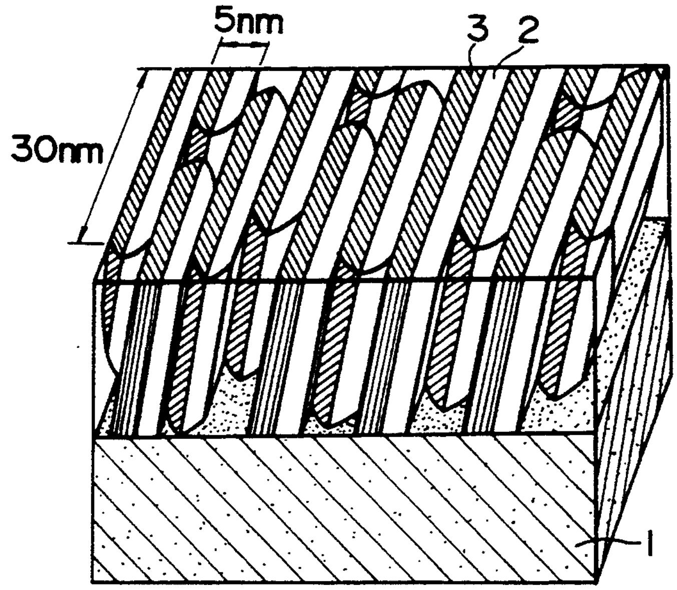
FIG. 3 is a pictorial representation of the anisotropic composite material of Example 3.

FIG. 3 shows the structure of a further composite material consisting of a multiplicity of particulates of two kinds of materials. The particulates are dispersed in the composite material. Some of the particulates consisting of the one material are in tight contact with some of the particulates consisting of the other material. The particulates are inclined to the normal to the surface of the substrate. The average thickness of the particulates is several nanometers, and the average length is tens of nanometers. Two kinds of particulates in the form of flat sheets are stuck on each other in an opposite relation to each other to form pairs. Spaces are formed between the longitudinally adjacent pairs of particulates.

The transmitted electron micrographs shown in FIGS. 8–10 and 13 show the structures of the composite materials described above. It can be seen from these micrographs that relatively dark portions alternate with relatively bright portions on the surface of each composite material such that these two kinds of particulates fill the surface. Although these particulates assume various shapes, the particulates extend vertically as a whole. The average thickness is several nanometers. The average length is tens of nanometers.

Figure 4:
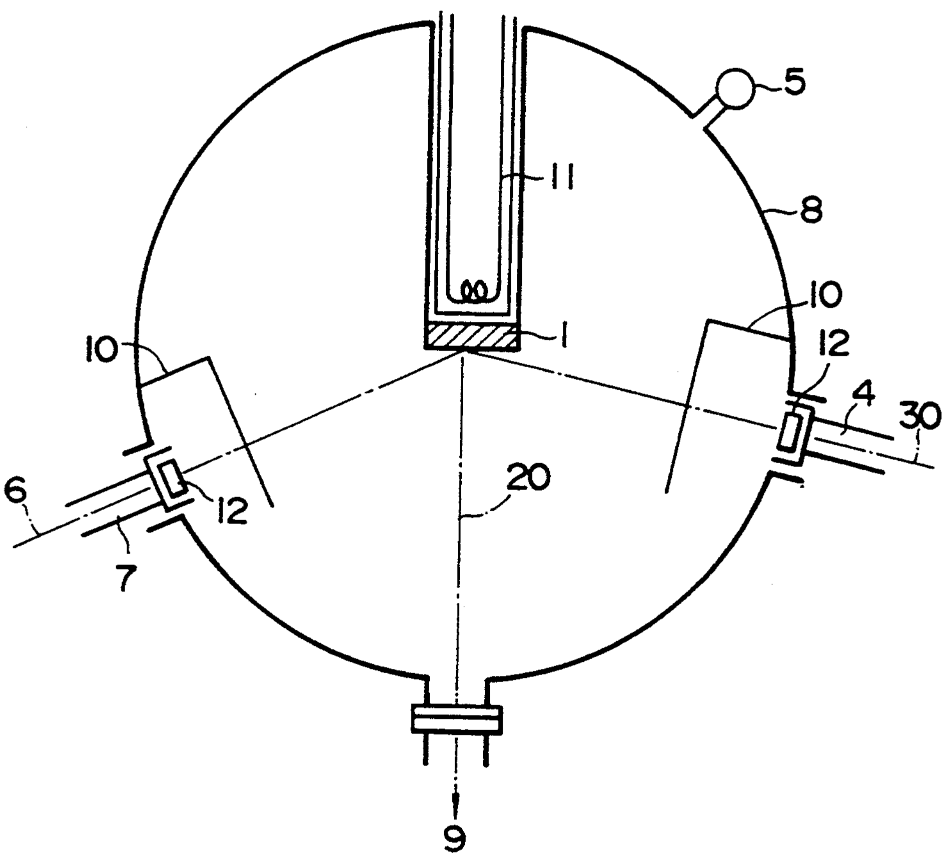
FIG. 4 is a schematic diagram of an apparatus for producing an anisotropic composite material according to the invention.

Referring next to FIG. 4, there is shown an apparatus for producing an anisotropic composite material consisting of particulates of dimensions on the order of nanometers. The apparatus comprises a vacuum vessel 8, a heater 11, two small-sized magnetron sputtering sources 4 and 7. A substrate 1 is placed around the center of the vacuum vessel 8 and appropriately heated by the heater 11. The materials which compose anisotropic composite material according to the invention are sputtered from the magnetron sputtering sources 4 and 7.

The small-sized magnetron sputtering source 4 is inclined at an angle of 30°–89° to the normal 20 of the surface of the substrate. The direction of the sputtering source 4 is indicated by numeral 30. The other small-sized magnetron sputtering source 7 is inclined at an angle larger than 30° from the direction 30. The direction of the source 7 is indicated by numeral 6. As an example, the sputtering source 7 is located on the opposite side of the sputtering source 4 within the plane defined by both normal 20 of the surface of the substrate and direction 30, and is inclined at an angle of 0°–89° to the normal 20 of the surface of the substrate. With discharge at both sputtering sources, materials are simultaneously deposited from targets onto the substrate to form a film. The thickness of particulates of dimensions on the order of nanometers can be varied without changing the number of particulates per unit volume by varying the ratio of the electric power supplied to the sputtering source 4 to the electric power supplied to the other sputtering source 7. Also, the angles at which the deposited materials are inclined can be varied by changing the ratio of the electric power supplied to one sputtering source to the electric power supplied to the other. At this time, if the normal of the surface of the substrate is inclined within the plane defined by both normal 20 of the surface of the substrate and direction 30 without varying the angle between both sputtering sources, then the angle of tilt of the microscopic particulates can be reduced down to zero.

The substrate is heated to a temperature that is less than one third of the lower one of the melting points of the two kinds of evaporated materials. When the substrate is heated at a higher temperature within this range, the evaporated materials easily move on the substrate. The particulates of dimensions on the order of nanometers easily make intimate contact with each other. Conversely, when the materials are deposited at a lower temperature, more voids are created as shown in FIG. 2.

Figure 6:
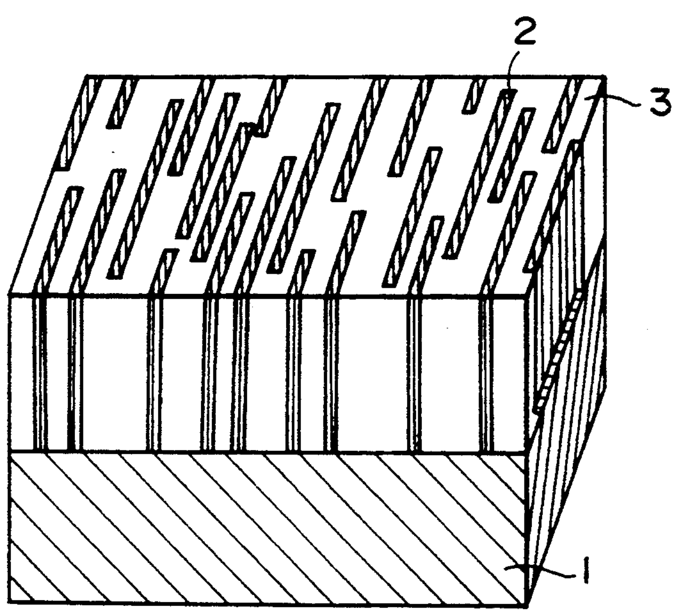
FIG. 6 is a pictorial representation of the anisotropic composite material of Example 4.

When the same material is evaporated from both sputtering sources, numerous particulates of dimensions on the order of nanometers are dispersed in the structure such that voids are formed therebetween as shown in FIG. 6.

By using a substrate formed of a material (such as NaCl) capable of being removed with water, a composite material without a substrate may be obtained.

EXAMPLE 1

An anisotropic composite material according to the invention was produced, using the apparatus shown in FIG. 4, and its characteristics were investigated. The substrate 1 was placed in the center of the vacuum vessel 8. The small-sized magnetron sputtering source 4 was loaded with a $SiO_2$ target and provided in a direction 30 inclined at an angle of 70° to the normal 20 of the surface of the substrate 1. The other small-sized magnetron sputtering source 7 was loaded with a CdTe target and inclined at an angle of 70° to the normal 20 of the surface of the substrate in a direction 6 opposite to the direction 30 within the plane defined by both normal 20 and direction 30. The argon gas pressure inside the sealed vessel was $5\times10^{-3}$ mmHg. Electric discharge was started by both sputtering sources. An electric power of 220 W and an electric power of 180 W were supplied to the $SiO_2$ target and CdTe target, respectively. The evaporation was carried out for 10 minutes. $SiO_2$ and CdTe were simultaneously deposited onto the substrate which was heated to 150° C. by the heater 11.

The formed film was observed with a scanning electron microscope and a transmission electron microscope. It was found that an anisotropic composite structure consisting of particulates of dimensions on the order of nanometers was formed. The structure is diagrammatically shown in FIG. 1. The average thickness of the flat portions drawn in black was 3 nm, and the average length was 20 nm. The height was about 500 nm. These microscopic portions were oriented with their length perpendicular to the incident direction of sputtered particles and inclined toward the sputtering source 4 at an angle of 6° from the normal of the surface of the substrate.

The resultant film was investigated using x-ray diffraction. Diffraction lines corresponding to CdTe were detected.

Figure 5:
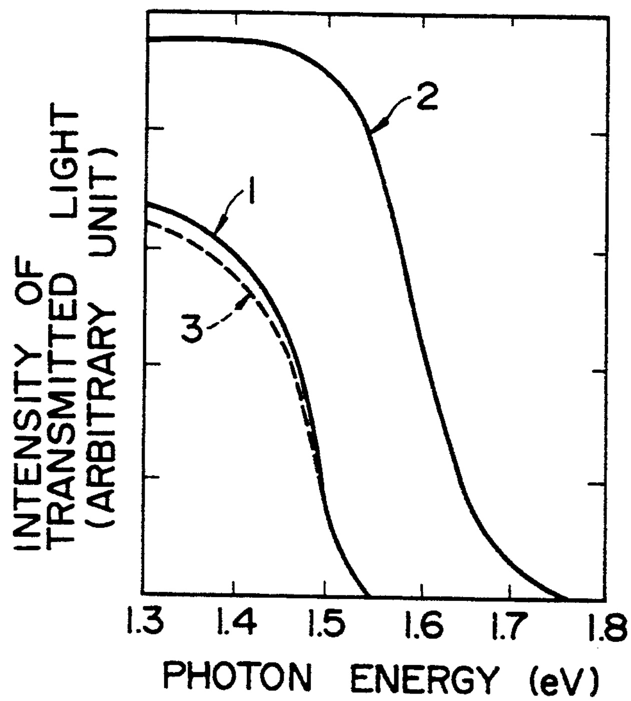
FIG. 5 is a graph showing the relation of the intensity of transmitted light to the photon energy.

Using a plane-polarized light as a probe, the absorption spectrum was measured. The results are shown in the graph of FIG. 5. Curve 1 indicates the intensity of the transmitted light when the direction of polarization of the probing light was coincident with the direction of orientation of the longer edges of the particulates of CdTe three-dimensionally distributed in the film. Curve 2 indicates the intensity of the transmitted light when these two directions were perpendicular to each other. For comparison, curve 3 indicates the absorption spectrum of a CdTe polycrystalline bulk substance.

It can be seen from the graph that curve 1 approximates curve 3 obtained from the polycrystalline bulk substance but the absorption end of curve 2 has shifted to the higher energy side than the absorption end of curve 1. This is due to the anisotropy of the quantum confinement effect of the anisotropic composite structure. In this way, the anisotropic composite material of the invention shows a great nonlinear optical effect, because the thickness of the particulates of the composite material are substantially uniform.

EXAMPLE 2

A fundamental optical device for converting randomly polarized light into linearly polarized light such as an optical polarizing plate was produced from an anisotropic composite material consisting of particulates of dimensions on the order of nanometers. The same apparatus as in Example 1 was used. The small-sized magnetron sputtering source 4 was loaded with a $SiO_2$ target. The small-sized magnetron sputtering source 7 was loaded with an Al target. An electric power of 200 W was supplied to both targets. $SiO_2$ and Al were simultaneously deposited onto the substrate under conditions similar to the conditions used in Example 1 except that the substrate was maintained at room temperature.

Investigation of the formed film with a scanning electron microscope and a transmission electron microscope revealed that an anisotropic composite structure consisting of particulates of dimensions on the order of nanometers was produced. The structure is diagrammatically shown in FIG. 2. In this structure, a multiplicity of the particulates of the average thickness of 5 nm, the average length of 30 nm, and the height of about 1,500 nm were homogeneously dispersed. Voids having an average width of 5 nm existed in the structure. The particulates of the materials $SiO_2$ and Al which took the form of flat sheets of similar thicknesses were stuck on each other. The particulates were oriented with their length perpendicular to the incident direction of the sputtered particles. Since the anisotropic particulates of dimensions on the order of nanometers were oriented, the film showed a good polarization property even in visible light region.

Heretofore, a polarizing plate made of a polymer film such as polyvinyl alcohol has been used. A dichroic property of this system arizes from the following process. The matrix polymer including iodine or methylene blue dye molecule is stretched uniaxially to get dichroism caused by the orientation of the dye molecules. The film is bonded to a plate of glass or plastic. This process gives of course not so precise polarizer. In addition, the polarizer is not resistant to heat. Furthermore, the polarizer suffers from problems intrinsic to resins such as vulnerability to ultraviolet radiation.

Conventionally, a grating type polarizing device having a large aspect ratio has been fabricated in the manner described now. Grooves are etched on the surface of a substrate of $SiO_2$ or other material at regular intervals of hundreds of nanometers by semiconductor microfabrication techniques. A metal such as aluminum is deposited obliquely on the side surfaces of the grooves up to a thickness of several nanometers. Then, the aluminum layer adhering to the plane excluding the grooves is removed by ion milling, thus completing the polarizing device. Since the regularly spaced grooves are formed by exposing the photoresist to interference fringes created by holographic interferometry, it is difficult to greatly increase the area of the polarizing device. Furthermore, it is expensive to fabricate, because the manufacturing process is complex. Therefore, it is not adapted for a display unit. Moreover, at shorter wavelengths of the visible region which are close to the intervals between the grooves, light is scattered and so the efficiency is low.

In the present example, the anisotropic composite material made up of particulates of dimensions on the order of nanometers shows excellent polarizing characteristics. Additionally, it is excellent in durability, since it is made from inorganic materials. Also, a thin polarizing plate in the form of a thin film can be produced in one process by the present example of manufacturing method. This polarizing plate can be fabricated more economically and more easily than heretofore. Further, a thin polarizing plate having a large area can be fabricated without difficulty.

EXAMPLE 3

The present example of anisotropic composite material was applied to a photovoltaic device producing photoelectromotive force when illuminated with light. The same apparatus as used in Example 1 was employed. The small-sized sputtering sources 4 and 7 were loaded with a CdS target and a CdTe target, respectively. The substrate was retained at room temperature. An electric power of 220 W was supplied to the CdS target. An electric power of 180 W was supplied to the CdTe target. CdS and CdTe were simultaneously deposited on the substrate under conditions similar to the conditions used in Example 1 except for the above points.

The structure of the formed film was investigated with a scanning electron microscope and a transmission electron microscope. It was found that the film had an anisotropic composite structure consisting of particulates of dimensions on the order of nanometers. The structure is diagrammatically shown in FIG. 3. The average thickness of the particulates was 5 nm, the average length was 30 nm, and the height was about 500 nm. The particulates extended from the surface of the substrate to the surface of the film and were dispersed in large quantities in three dimensions. The direction of the length of the flat particulates was perpendicular to the incident direction. The particulates were tilted by 5° from the normal of the surface of the substrate toward the sputtering source 4. Some of the two kinds of particulates were in intimate contact and continuous with each other. In this structure, sheets of CdS and CdTe having substantially the same thickness were stuck on each other. Large short-circuit currents could be taken from the photovoltaic device fabricated from the present example of the anisotropic composite material according to the invention.

A photovoltaic device used as a photoelectric cell has been proposed in Japanese Patent laid-Open No. 129479/1984. In particular, a transparent electrode, a thin film of CdS, a thin film of CdTe, and another electrode are grown on a glass substrate. When the device is illuminated with light coming from the side of the glass substrate, photoelectromotive force is generated. However, the electromotive force produced when the circuit is open is as small as 750 mV. Therefore, in order to obtain a sufficient voltage, a number of photovoltaic devices of this laminate construction must be connected in series. This necessitates a large area. A photovoltaic device comprising an anisotropic composite material consisting of particulates of dimensions on the order of nanometers and having a glass substrate on which CdTe is obliquely deposited up to a thickness of about hundreds of nanometers has been proposed in Japanese Patent Publication No. 9179/1985. Essentially, gold is deposited on the surface of the obliquely deposited and oriented CdTe film to form two electrodes extending perpendicular to the plane including both the normal of the surface of the substrate and the incident direction. Two electrodes are spaced from each other by a desired distance. This device can produce a photoelectromotive force exceeding 100 V per centimeter of electrode spacing. However, it is impossible to take large electric currents from the device.

Electrodes similar in configuration to the conventional CdTe photovoltaic device were disposed on the film fabricated in the present example to fabricate a photovoltaic device. When this device was illuminated with light, the open voltage was about 40 V per centimeter of electrode spacing. The short-circuit current was about 200 times as great as the short-circuit current produced by the CdTe photovoltaic device of the same shape. Although the mechanism is not understood, it is considered that these facts were created by series connection of CdS/CdTe photocells in the same way as the CdTe photovoltaic device. It is thought that the great short-circuit current was due to the photoconductivity of CdS.

EXAMPLE 4

In this example, the novel anisotropic composite material consisting of particulates of dimensions on the order of nanometers is applied to a fundamental optical device which converts one polarized state of light into another polarized state of light. One example of this fundamental optical device is an optical phase plate that utilizes the birefringence of a substance to convert plane-polarized light into circularly polarized light (in this case, the phase plate is called a quarter-wave plate) or to convert plane-polarized light into light that is plane-polarized at right angles to the former light (in this case, the phase plate is called a half-wave plate).

The same apparatus was used as in Example 1. The small-sized sputter evaporation sources 4 and 7 were loaded with targets, respectively, both of which consisted of $Ta_2O_5$. The substrate was kept at room temperature. An electric power of 200 W was supplied to both targets. Electric discharge was produced for 30 minutes. $Ta_2O_5$ was deposited as a film onto the substrate under conditions similar to the conditions used in the above examples except for the above-described points.

The structure of the formed film was investigated with a scanning electron microscope and a transmission electron microscope. It was found that the film had an anisotropic composite structure consisting of flat particulates of dimensions one the order of nanometers. The structure is diagrammatically shown in FIG. 6. The average thickness of the particulates was 5 nm, the average width was 30 nm, and the height corresponding to the film thickness was 1,500 nm. The particulates extended vertically to the substrate and were dispersed in the film containing voids having an average width of 3 nm. The anisotropic particulates were so oriented that the direction of length of the flat particulates was perpendicular to the direction in which the evaporated materials were entered.

In this example, the thin film of the anisotropic composite material consisting of particulates of dimensions on the order of nanometers showed good birefringent characteristics. Although the film was a monolayer, the birefringence was greatest in the direction of the normal of the surface of the substrate.

The prior art method of producing an inorganic birefringent thin film consists in obliquely depositing a material onto the surface of a substrate to form a first layer, then inverting the substrate as viewed from the evaporation source, and subsequently forming a second oblique deposition layer. In this way, the manufacturing process is complex. In contrast, in the present example, the composite material can be easily produced by forming a single film.

EXAMPLE 5

In this example, an apparatus that was an improvement over the apparatus shown in FIG. 1 was used. The produced anisotropic composite structure consisting of particulates of dimensions on the order of nanometers could be expected to show a quantum size effect and an optical anisotropy.

Figure 7:
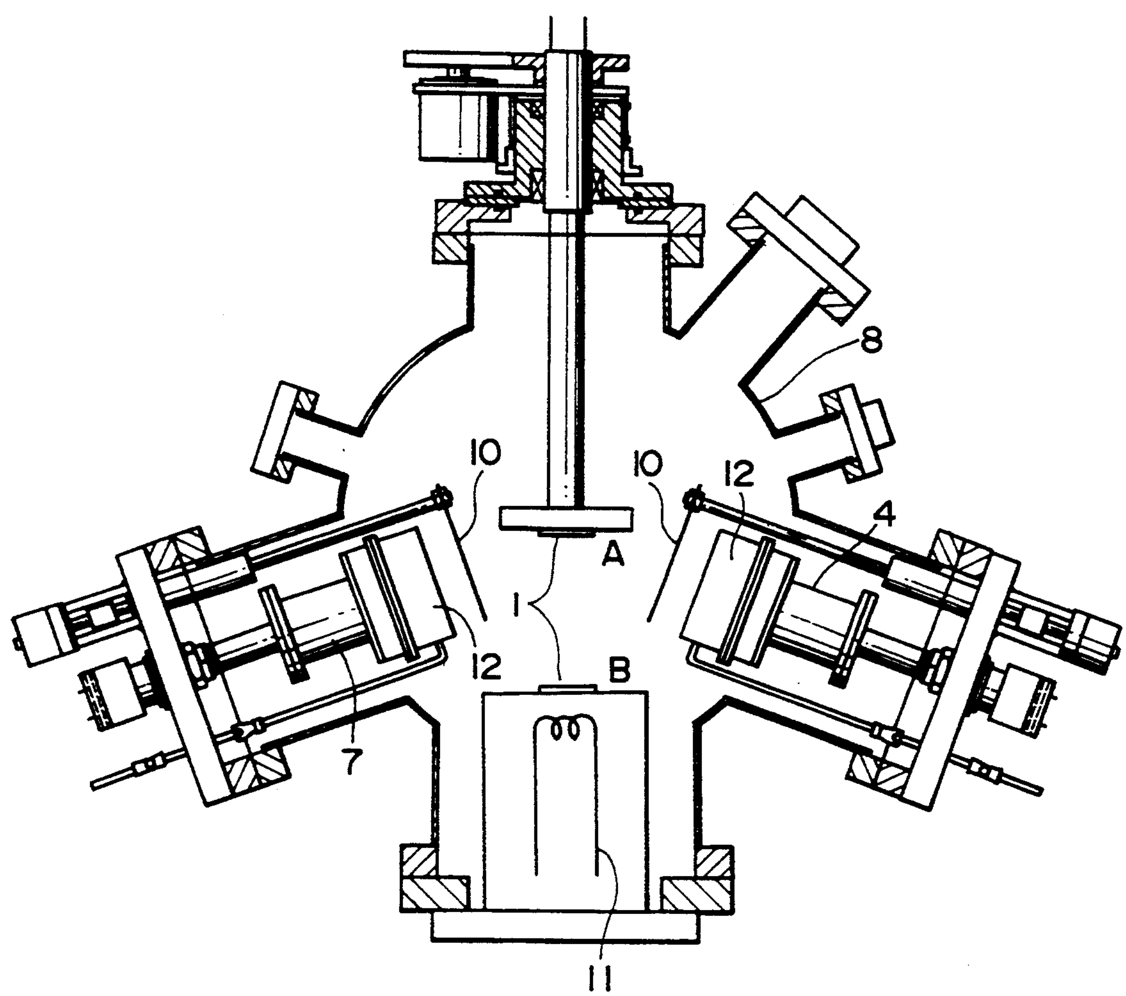
FIG. 7 is a schematic diagram of another apparatus for producing an anisotropic composite material according to the invention.

In this example 5, the anisotropic composite structure consisting of particulates of dimensions on the order of nanometers was produced by the use of the apparatus shown in FIG. 7. In this apparatus, the targets were placed closer to the substrate than in the apparatus shown in FIG. 1 to improve the efficiency at which the film was produced. However, the incident angle of the evaporated material incident on the substrate was increased. To minimize the angular divergence of each target as viewed from the position of the substrate, the position of the substrate was changed from A to B.

The sputtering sources 7 and 4 were loaded with a ZnTe target and a $SiO_2$ target, respectively. The Ar gas pressure inside the vacuum vessel 8 was $5\times10^{-3}$ mmHg. Electric discharge was initiated by both sputtering sources. An electric power of 10 W and an electric power of 300 W were supplied to the ZnTe target and the $SiO_2$ target, respectively. The substrate was kept at room temperature . ZnTe and $SiO_2$ were deposited simultaneously onto the surface of the substrate. The ratio of the amount of the deposited ZnTe to the amount of the deposited $SiO_2$ was 1:1 by weight. Both incident angles were 55°.

Figure 8:
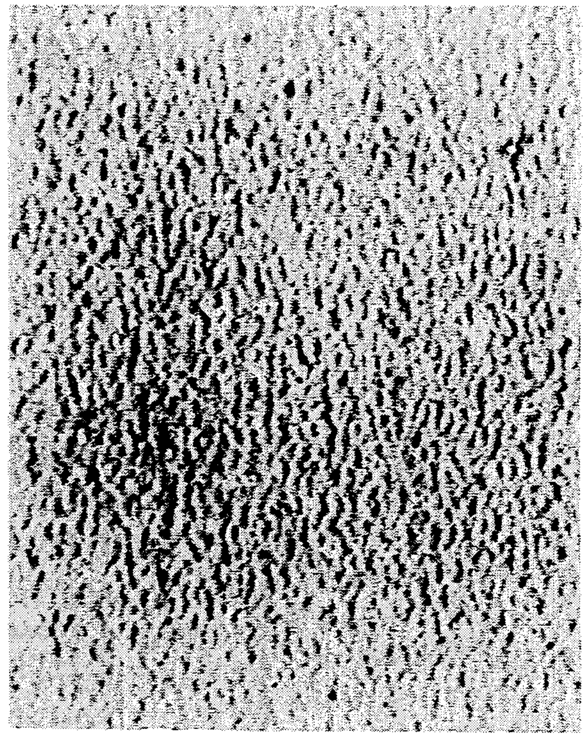
FIGS. 8, 9, 10 are electron micrographs of the anisotropic composite material of Example 5, for showing the structure of the particulates of the material of dimensions on the order of nanometers, the micrographs being taken at different magnifications.
Figure 9:
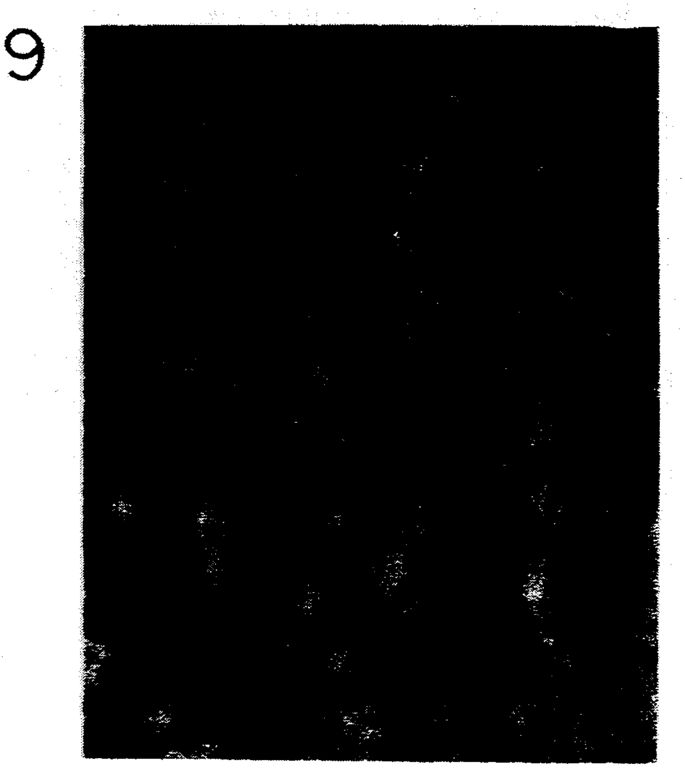
Figure 10:

FIGS. 8, 9, 10 are transmission electron micrographs of the formed film, taken at three different magnifications. The observations were made from the direction of the normal to the surface of the substrate. The projected incident direction of the evaporated materials is horizontal in each micrograph. ZnTe was caused to impinge on the substrate from the left side, while $SiO_2$ was made to impinge on the substrate from the right side. The micrograph of FIG. 8 shows that the surface of the film is uniformly filled by peculiar fine structures. In the micrograph of FIG. 9 that was taken at a greater magnification, the surface of the substrate is filled by relatively dark and relatively bright portions which alternate with each other. Although these portions assume various forms, most of them generally extend vertically. The average width of these portions is several nanometers, and the average length is tens of nanometers. Thus, it can be seen that an anisotropic composite structure according to the invention has been realized. In the micrograph of FIG. 10 that was taken at a still greater magnification, lattice images are observed around and in vertically extending relatively dark portions with an average thickness of several nanometers and an average length of tens of nanometers. Since the intervals between the lattice images correspond to the intervals between the (111) planes of ZnTe crystal lattice, it can be understood that these particulates are crystallites of ZnTe of dimensions on the order of nanometers.

Figure 11:
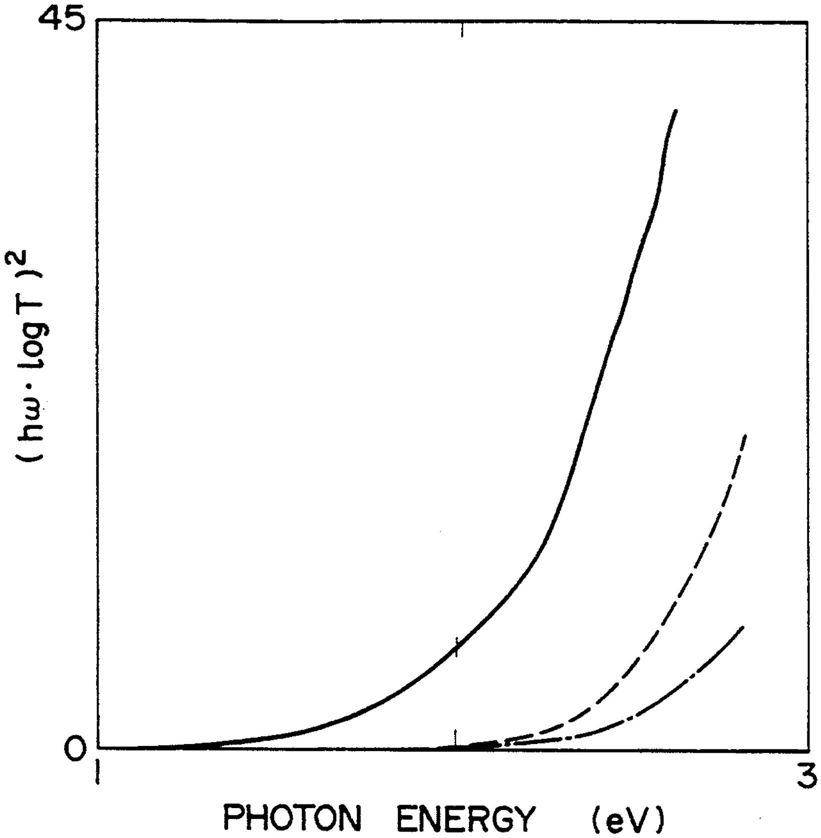
FIG. 11 is a graph in which the square of the product of log(transmittance) and photon energy is plotted against the energy of the photons transmitted through the anisotropic composite material of Example 5.
Figure 12:
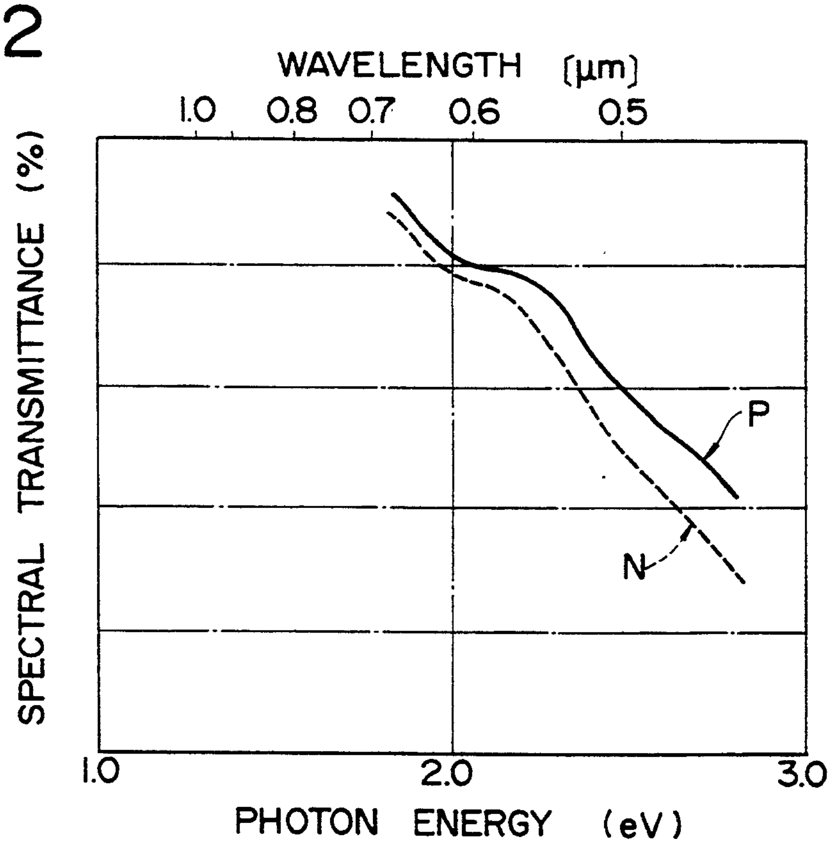
FIG. 12 is a graph in which the spectral transmittance of the anisotropic composite material of Example 5 is plotted against the energy of the photons transmitted through the composite material.

On the other hand, no lattice image is observed in the center of each relatively bright portion. These are typical images of amorphous substances and attributed to $SiO_2$. Curve N of FIG. 12 shows the spectral transmittance of this sample, measured using incident light which was plane-polarized vertically as viewed in FIG. 8. Curve P of FIG. 12 shows the spectral transmittance of the same sample, measured using incident light which was plane-polarized horizontally as viewed in FIG. 8. The spectral transmittance indicated by curve N is lower than that indicated by curve P, since the structural feature shown in FIG. 8 is reflected. Thus, the anisotropic composite material of the present invention not only shows the unidirectionally oriented microstructure as shown in FIGS. 8–10 but also shows anisotropy in macroscopic properties. In this structure, quantum confinement effect is produced inside each particulate of the semiconductor ZnTe, and a nonlinear optical effect will be produced. The graph of FIG. 11 shows that the quantum confinement effect is produced inside this sample and that a spectral transmission (indicated by the broken line) obtained from the anisotropic composite material is shifted toward the higher energy side of photons with respect to the spectral transmission (indicated by the solid line) of pure ZnTe which was formed by depositing the material onto the substrate maintained at 250° C. from the direction of the normal of the substrate and which took a bulk form. In the graph, the square of the product of the log(transmittance T) and the photon energy $h\omega$ is plotted on the vertical axis. The energy $h\omega$ is plotted on the horizontal axis. The curve created from the values actually measured from the anisotropic composite material ZnTe—$SiO_2$ is shifted toward the higher energy side. The curve indicated by the broke line was obtained by making a measurement in which the direction of the plane-polarized component of the probing light was made parallel to the direction of length of the flat particulates of the anisotropic composite material. The curve indicated by the dot-and-dash line was obtained by making a measurement in which the direction of the linearly polarized component of the probing light was made perpendicularly to the direction of the length of the particulates. The curve indicated by the dot-and-dash line is shifted more than the curve indicated by the broken line. This means that anisotropy is reflected in the quantum confinement effect.

EXAMPLE 6

Figure 13:
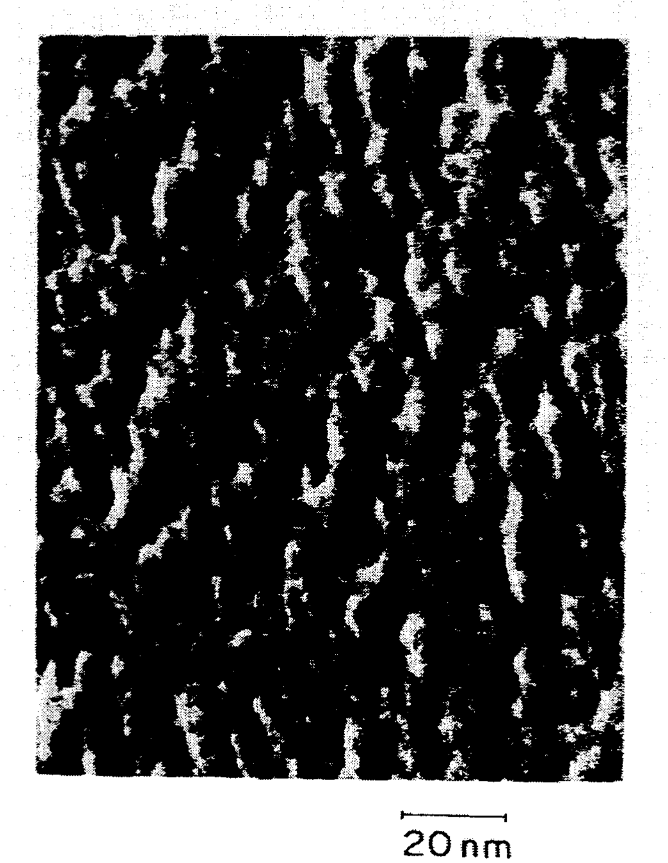
FIG. 13 is an electron micrograph of the anisotropic composite material of Example 6, for showing the structure of the particulates of dimensions on the order of nanometers.

W and Si were simultaneously deposited on the substrate with the apparatus shown in FIG. 7 in the same way as in Example 5. A transmission electron micrograph of the obtained film is shown in FIG. 13. W was deposited from right, while Si was deposited from left. Again, an anisotropic composite structure according to the invention was accomplished, though the structure was slightly different from the structure shown in FIG. 8. Similar structures were realized by a combination of Pt and Si, a combination of Cu and $SiO_2$, and many other combinations of materials.

Figure 14:
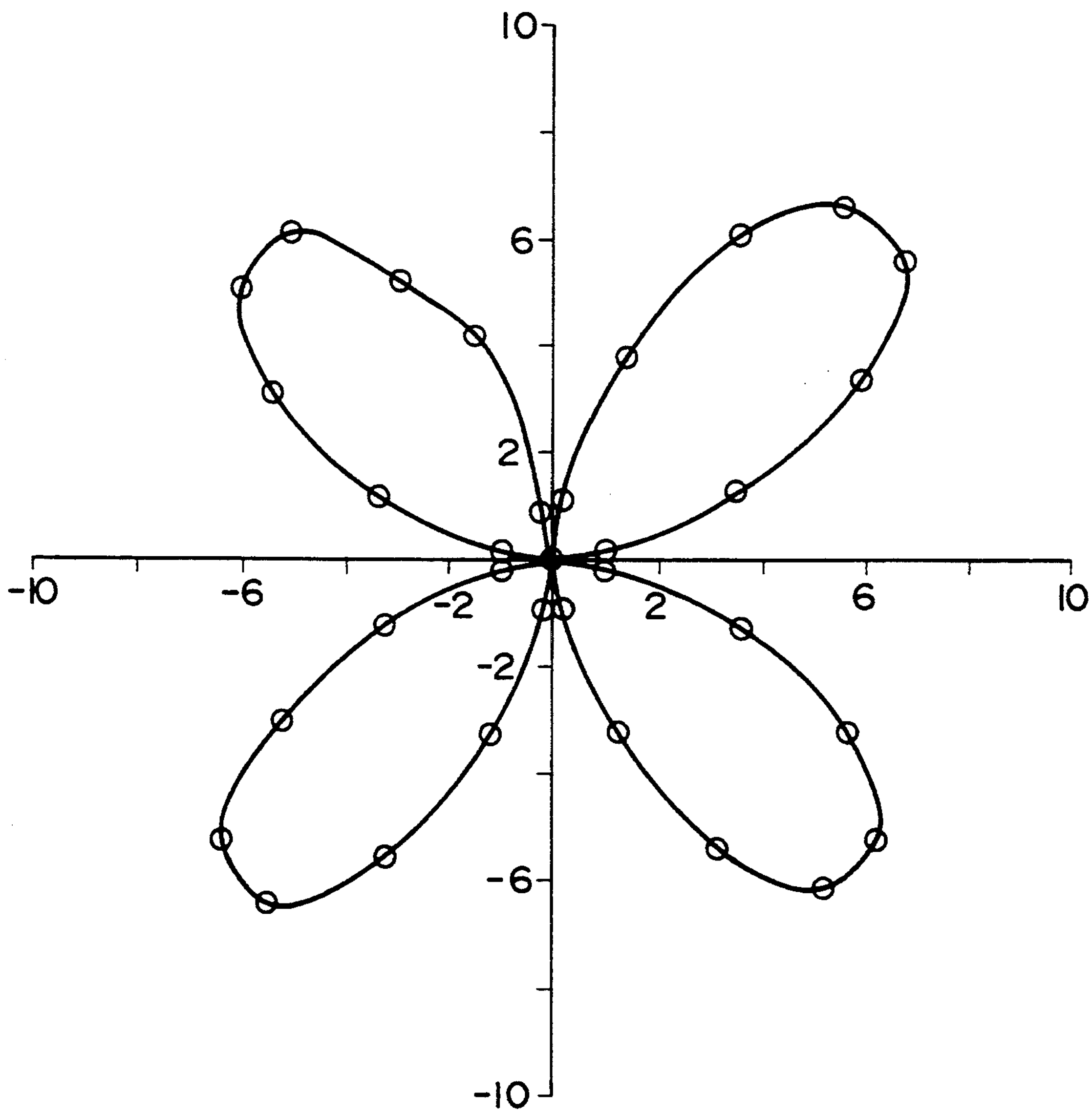
FIG. 14 is a diagram showing the birefringent characteristics of the anisotropic composite material of Example 6.

FIG. 14 shows the birefringent characteristics of an anisotropic composite structure consisting of particulates of Cu and $SiO_2$, the particulates having dimensions on the order of nanometers according to the invention. The samples were rotated within a plane between two polarizing plates with their polarizing direction crossed with each other. In FIG. 14, the change in the transmittance of each sample is plotted against the angular position. The absolute value of the straight line connecting each point with the origin shows the intensity of transmitted light. The angle formed between this straight line and the X axis indicates the angular position.

If the sample does not exhibit birefringence, no light is permitted to pass through the sample by the effect of the two crossed polarizing plates. If the sample shows birefringence, and if the direction of the main axis of the optical anisotropy causing the birefringence deviates from the direction of the plane-polarized component of the light, then the light plane-polarized by the first polarizing plate is converted into elliptically polarized light and so the light is transmitted through the second polarizing plate. This effect becomes greatest when the direction of the main axis of the optical anisotropy deviates from the direction of the plane-polarized component by 45°. Therefore, the intensity of the transmitted light becomes alternately maximum and minimum whenever the sample rotates through 45°. Where the intensity is represented in polar coordinates, the characteristic draws a pattern resembling a four-leaved clover.

Figure 15:
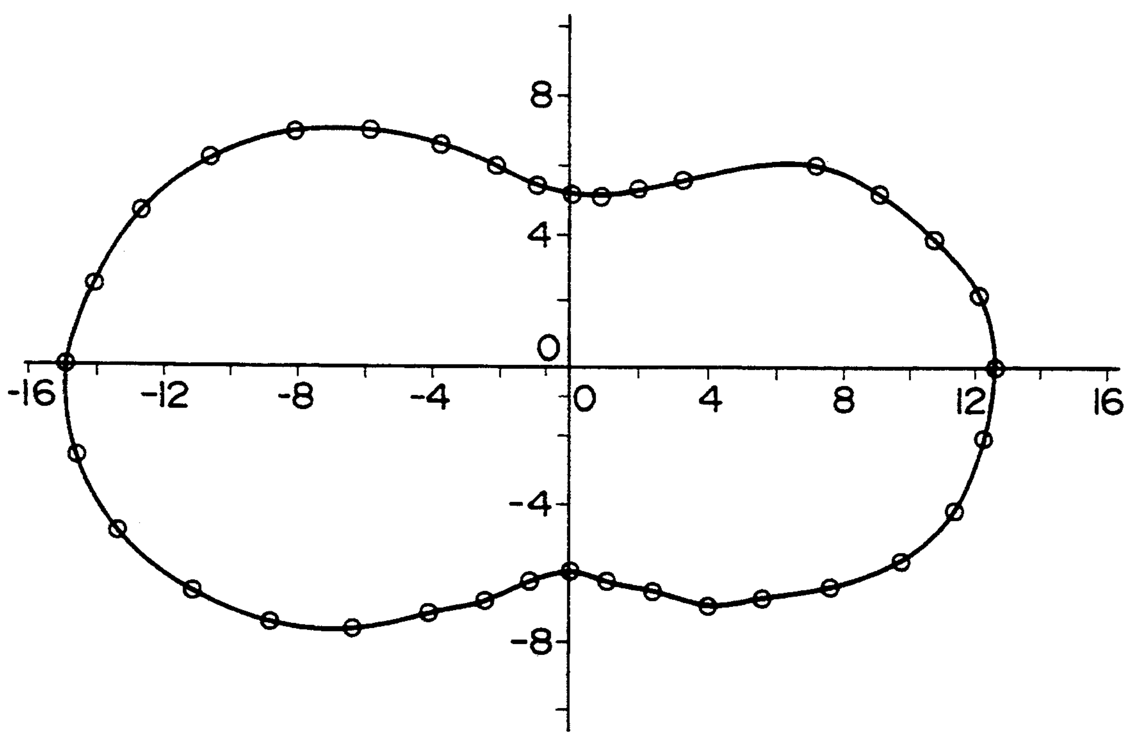
FIG. 15 is a diagram showing the polarizing characteristics of the anisotropic composite material of Example 6.

FIG. 15 shows the polarizing characteristics of an anisotropic composite structure consisting of particulates of Cu and $SiO_2$, the particulates having dimensions on the order of nanometers according to the invention. Plane-polarized light having a wavelength of 632.8 nm was used to measure the transmittance of the sample. The sample was rotated within a plane. In FIG. 15, the change in the transmittance is plotted against the angular position. The absolute value of the straight line connecting each point with the origin shows the intensity of transmitted light. The angle formed between this straight line and the X axis indicates the angular position. These macroscopic properties draw a gourd-shaped form rather than a circle. Hence, the graph of FIG. 15 indicates that an anisotropic composite material according to the invention is attained.

What is claimed is:

1. An anisotropic nanophase composite material comprising a nanophase composite structure of at least two inorganic materials, said nanophase composite structure containing a multiplicity of particulates, each of said particulates having a flat sheet structure wherein each of said particulate comprises a first layer of one of said at least two materials, and a second layer of the other of said at least two materials, and said first layer is in contact with said second layer, and said particulates have an average thickness of 1 to 10 nanometers and an average length of not less than 10 nanometers, the length being larger than the thickness, and the particulates being anisotropically oriented in a given direction and wherein said particulates are three-dimensionally dispersed within the structure.

2. The anisotropic nanophase composite material of claim 1, which is in the form of a monolayer film.

3. The anisotropic nanophase composite material of claim 1, wherein said nanophase composite structure is formed on a substrate.

4. The anisotropic nanophase composite material of claim 1, wherein at least one material of said particulates is selected from the group consisting of semiconductors, substances which form ionic crystals, and metals which show quantum confinement effects.

5. The anisotropic nanophase composite material of claim 1, wherein said composite structure is formed of two different inorganic materials one of which is an oxide or fluoride and the other of which is a semiconductor or metal.

6. The anisotropic nanophase composite material of claim 1, wherein said composite structure is formed of two different semiconductors.

7. The anisotropic nanophase composite material of claim 1, wherein said composite structure is formed of either of two different oxides or of two different fluorides.

8. The anisotropic nanophase composite material of claim 1, wherein said particulates are not in contact.

9. The anisotropic nanophase composite material of claim 8, wherein said at least two inorganic materials are selected from the group consisting of oxides, fluorides, semiconductors and metals.

10. The anisotropic nanophase composite material of claim 1, wherein said particulates are in at least partial contact such that said one of said at two materials of a given particulate at least partially contacts the other of said at least two materials of an adjacent particulate.

11. The anisotropic nanophase composite material of claim 10, wherein said at least two inorganic materials are members selected from the group consisting of oxides, fluorides, semiconductors and metals.

12. The anisotropic nanophase composite material of claim 8 or 10, wherein said at least two inorganic materials are selected from the group consisting of MgO, $Al_2O_3$, SiO, $SiO_2$, $TiO_2$, $V_2O_5$, CuO, ZnO, $GeO_2$, $ZnO_2$, $Nb_2O_5$, $MoO_3$, $In_2O_3$, $SnO_2$, $HfO_2$, $Ta_2O_5$, $WO_3$, $Bi_2O_3$, $La_2O_3$, $CeO_2$, $CaF_2$, $CeF_2$, $MgF_2$, CdS, CdSe, CdTe, GaAs, Ge, ZnTe, ZnS, Fe, Co, Ni, Au, Ag, Al, Pt and Ca.

13. The anisotropic nanophase composite material of claim 1, wherein said composite particulates of two materials are formed by obliquely depositing two inorganic materials onto a surface.

14. An anisotropic nanophase composite material produced by a method comprising the steps of:

maintaining the surface of a substrate at a temperature (in K) less than one third of the temperature (in K) of the lower one of the melting points of two different inorganic materials to be deposited onto the substrate; and simultaneously depositing the two different materials onto the surface of the substrate in a vacuum vessel wherein the material of the lower melting point is evaporated from a direction inclined at an angle of 30°–89° to the normal to the surface of the substrate and that the other material is evaporated from a direction differing from the former direction by at least 30°, such that the composite material produced exhibits a non-linear optical effect, birefringence, polarization or a photovoltaic effect, wherein said composite material comprises flat sheet particulates, said particulates comprising said two different inorganic materials.

* * * * *